(12) United States Patent
Anderson et al.

(10) Patent No.: US 6,521,347 B1
(45) Date of Patent: Feb. 18, 2003

(54) LAMINAR PRODUCT AND PROCESS FOR PREPARING THE SAME

(75) Inventors: Jerrel Charles Anderson, Vienna, WV (US); Ioannis V. Bletsos, Vienna, WV (US); John W. Turnbull, Wilmington, DE (US); Bert C. Wong, Marietta, OH (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/601,529

(22) PCT Filed: Mar. 4, 1999

(86) PCT No.: PCT/US99/04715

§ 371 (c)(1),
(2), (4) Date: Aug. 2, 2000

(87) PCT Pub. No.: WO99/44821

PCT Pub. Date: Sep. 10, 1999

(51) Int. Cl.[7] ................................................. B32B 17/00
(52) U.S. Cl. ......................... 428/437; 428/426; 156/99; 156/106
(58) Field of Search ................................. 428/437, 426; 156/99, 106

(56) References Cited

U.S. PATENT DOCUMENTS

| 3,841,890 | A | * | 10/1974 | Coaker et al. | |
|---|---|---|---|---|---|
| 4,276,351 | A | | 6/1981 | Phillips | 428/437 |
| 4,292,372 | A | | 9/1981 | Moynihan | 428/437 |
| 4,383,057 | A | | 5/1983 | Yamamoto et al. | 523/333 |
| 4,663,235 | A | | 5/1987 | Fock et al. | 428/437 |
| 4,707,304 | A | * | 11/1987 | Gomez | |
| 5,434,207 | A | | 7/1995 | Fischer | 524/270 |
| 5,547,736 | A | * | 8/1996 | Simon et al. | |
| 5,728,472 | A | * | 3/1998 | D'Errico | |

FOREIGN PATENT DOCUMENTS

| DE | 3018235 | 11/1980 |
|---|---|---|
| EP | 0161583 | 11/1985 |
| EP | 0373139 | 6/1990 |
| EP | 0617078 | 9/1994 |

OTHER PUBLICATIONS

PCT International Search Report dated Jun. 25, 1999.

* cited by examiner

*Primary Examiner*—Robert Dawson
*Assistant Examiner*—Marc S. Zimmer
(74) *Attorney, Agent, or Firm*—Kevin S. Dobson

(57) ABSTRACT

A laminar structure comprised of at least one layer of glass and a sheet of plasticized PVB containing an adhesion control agent is provided wherein pin point pockets of air which are entrapped in said sheet coalesce and cause delamination of said structure, delayed delamination and associated defects are prevented by adding a nucleating agent with the plasticized PVB by coating the sheet or glass surface with a nucleating agent, by extruding the PVB sheet with the nucleating agent in the composition, or by forming the nucleating agent in situ during the extrusion or lamination process.

8 Claims, 1 Drawing Sheet

LAMINAR PRODUCT AND PROCESS FOR PREPARING THE SAME

BACKGROUND OF THE INVENTION

Laminators are constantly being challenged to reduce or eliminate visual defects in laminated glass structures. Some defects can be directly attributed to glass quality but many are considered to be associated with the laminating process and more specifically with the commonly used polyvinyl butyral (PVB) interlayer. Defects can look like bubbles or pockets of air with elongated worm-like or dendritic shapes. Elongated worm-like and dendritic defects are often referred to as delamination. Some defects are visible immediately after autoclaving, but others develop hours or days after lamination. Laminators who use vacuum for de-airing tend to experience higher defect rates in warm weather.

Traditionally, delamination is viewed as the result of adhesive bond failure between the glass and the PVB interlayer. That is, the adhesive forces cannot withstand the stresses that are due to mismatches in the glass as well as gaps and pinches. A typical explanation for defects that are near a laminate's edge, is that the PVB absorbs moisture from the environment, which lowers the adhesion level leading to defect formation. Therefore, it is rationalized that during warm and humid seasons, moisture is absorbed at a higher rate, and hence causes more defects.

In the laminating industry there is general agreement that gaps and pinches do lead to defects. In fact gaps of approximately 0.1 mm in height over a distance of 5 cm are suspects for causing defects. The load required to achieve a 0.1 mm gap or pinch can be calculated from mechanical considerations, and it is a surprisingly low, 1.0 N/cm for 2.1-mm thick glass. For this reason, adhesive forces cannot explain the formation of most defects.

If the adhesion level is primarily responsible for defects, then higher adhesion levels should be able to overcome more stress, and hence, would accommodate larger gaps and pinches without causing a defect. However, our findings have shown this not to be true.

With respect to moisture absorption, the adhesive interlayer absorbs moisture from the environment until equilibrium is reached. The equilibrium level depends on the relative humidity and may differ for different interlayers. The mechanism for moisture absorption is diffusion, which means that the concentration of the diffusant is highest at the phase boundary (i.e., at the laminate's edge). A typical moisture profile of a PVB laminate exposed to 95% relative humidity at 40° C. for one week shows that only interlayer within 3–4 mm from the edge has moisture higher than 1.5%, and the moisture level hardly changes about 8 mm in from the edge. Most of the observed defects occur about 3–12 mm away from the edge and some extend slightly farther inwards. Very few defects are open to the edge where the moisture level is highest and where one would expect to have the lowest level of adhesion. Worm-like defects have been observed to disappear spontaneously while windshields are stored in hot, humid environments.

It is possible to adjust the adhesivity of the PVB interlayer so that even when laminated at high moisture, the final adhesion is suitable for use in automobile windshields. However, laminates made this way would fail if they are installed into automobiles which are driven in or exposed to high ambient temperatures. Bubbles form readily at temperatures less than 100° C. in laminates where the PVB interlayer has been equilibrated prior to lamination to a relative humidity higher than 50%. These laminates most likely would not pass the bake test or the boil test required by national and international standards (e.g., ANSI Z26, JIS R-3212, EC R-43, and others).

Another reason moisture intrusion does not explain many of the defects is that even in the absence of high moisture, adhesion at 30° C. is only a fraction of what it is at room temperature. Increasing the adhesion between the glass and the adhesive interlayer at room temperature, therefore, would not help to eliminate defects [that] tend to occur at higher temperatures. Further, correlation between data from tests run at temperatures well below room temperature, such as the pummel test, and delaminations is at least questionable.

The typical approach in attempting to solve delamination problems has been to include various additives in the adhesive sheet to increase the strength of the adhesive bond between the sheet and the glass plate. While such approaches have been successful in changing the adhesive level, and to some extent reducing delaminations, increasing adhesion upsets the delicate adhesion balance required to provide acceptable laminated products. It is well known that an adhesion level that is too high can make the laminate fail like a piece of monolithic glass and unable to absorb much energy upon an impact, or if the adhesion is too low, on impact large glass shards fly from the structure. In each instance, changing the adhesion level renders the laminate unacceptable.

We have found that the presence of air plays a most significant role in defect formation in laminated glass. De-airing and edge seal must be as complete as possible in pre-pressed laminates before autoclaving in order to avoid defects. Poor de-airing has been linked to delaminations in windshields after they have been shipped from their fabrication sites. In some cases, delaminations have caused automobile assembly lines to halt production, and the automobile manufacturers to incur substantial financial losses. The issue for the laminator often is that it is difficult to determine whether de-airing in a laminate is complete since a windshield can appear clear due to the dissolution of air in the PVB interlayer under high pressure during autoclaving, the final step in the lamination process.

It has now been found that delayed delaminations can be avoided by using surprisingly small amounts of nucleating agents as indicators for excess air in windshields and other laminated structures.

SUMMARY OF THE INVENTION

In accordance with the present invention, a glass/adhesive sheet laminar structure comprising at least one layer of glass and a sheet of plasticized polyvinyl butyral (PVB) which is not susceptible to delayed delamination is provided wherein the sheet of plasticized polyvinyl butyral (PVB) is stabilized by using one or more nucleating agents. Such nucleating agents may be incorporated in the PVB, applied to the surface of the PVB sheeting or applied to the layer of glass which is to be adhered to the PVB sheeting. Like boiling chips, nucleating agents lower the energy barrier for phase transitions and encourage the formation of small bubbles. When sufficient amounts are provided, the bubbles would be small and isolated, the stress from supersaturated air in the PVB interlayer is released, the nuclei or tiny pockets of air which are entrapped in the sheeting and are prevented from coalescing to form worm-like delaminations. Other properties of the laminar structure, such as adhesion, need not be changed necessarily by the use of the nucleating agent. The PVB has blended therein an adhesion control agent to provide a preselected level of adhesion between the layer of glass and sheet of PVB. Selected amounts of a nucleating agent may be blended with the PVB. The nucleating agent may be applied to the surface of the PVB sheet or the surface of the glass which contact each other. The amounts are further selected so that the level of adhesion between the layer of glass and sheet of PVB is not significantly changed, i.e. not changed more than about 20% of the absolute value of the adhesion.

Generally, from about 0.0001 to 0.1 part by weight of the nucleating agent per 100 parts by weight of the PVB resin will allow small nuclei to form in the event that there is supersaturated air in the plasticized PVB interlayer without any substantial change in the level of adhesion. Compounds that are not readily soluble in or miscible with the PVB interlayer should be selected. Examples encompass inert solids such as colloidal silica, insoluble hydroxides of alkaline earth metals, humectants or astringents such as chlorohydrates of aluminum and zirconium, mildly incompatible compounds such as polyethylene glycol and polydimethylsiloxane, and solids which form in situ during the extrusion of PVB sheets or during lamination such as magnesium, calcium and zinc salts of n-heptanoic and other carboxylic acids of four carbons or more.

BRIEF DESCRIPTION OF THE DRAWING

In describing the invention, reference will be made to the accompanying drawing in which the FIGURE is a diagrammatic illustration of a jig used for determining the compressive shear strength of a laminate.

DETAILED DESCRIPTION

Figure 1:
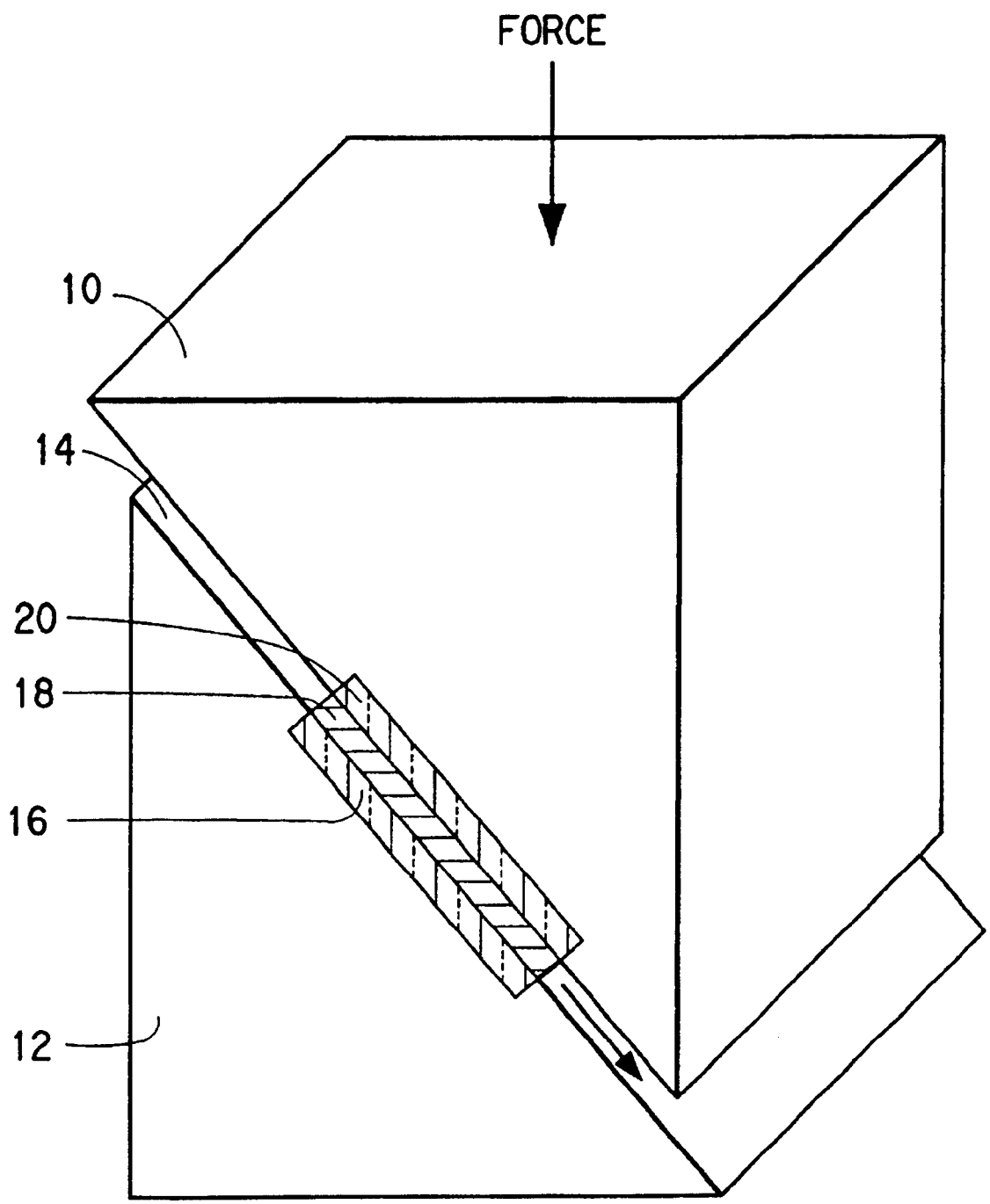

Plasticized PVB sheeting is prepared by processes well known in the art. A preferred process for preparation of plasticized PVB is disclosed in Phillips, U.S. Pat. No. 4,276,351 which is hereby incorporated by reference. A wide variety of adhesion control agents can be used with polyvinyl butyral sheeting. In the instant invention a PVB sheet plasticized with a compatible quantity of ester selected from the group consisting of triethyleneglycol di-n-heptanoate or esters and tetraethylene glycol di-n-heptanoate, or with a compatible quantity of similar branched or unbranched glycol di-esters such as triethylene glycol di-2-ethylbutyrate and triethylene glycol di-2-ethylhexanoate, and contains as an adhesion control agent an alkali or alkaline earth metal salt such as formate, acetate, sulfate and the like. A process for preparing such sheeting is disclosed in Moynihan, U.S. Pat. No. 4,292.372 which is hereby incorporated by reference. Other suitable adhesion control agents include potassium acetate, magnesium formate, magnesium acetate, magnesium neodecanoate, zinc and calcium salts of various organic acids.

As noted above, various materials can be used as nucleating agents in this invention: colloidal silica, chlorohydrates of aluminum and zirconium, polyethylene glycol, copolymers of polyethylene glycol such as poly(propylene glycol)-block-poly(ethylene glycol) and poly(propylene glycol)-blockpolyethylene glycol)-block-poly(propylene glycol), polydimethylsiloxane, salts of compounds which are insoluble or only sparingly soluble in the plasticized PVB interlayers. Some of the compounds may be added to the extrusion formulation of the interlayers or coated to the interlayer, others may be applied to the surface of the glass to be laminated, yet others may be formed in the fabrication process of the interlayers or the laminated article.

In the examples of this invention, 100 parts of dry PVB flake of nominally 23% by weight of unbutyralated vinyl alcohol groups are mixed with 35–40 parts of tetraethylene glycol di-n-heptanoate plasticizer and a light stabilizer (Tinuvin-P, Ciba Geigy or similar compounds) and an antioxidant which are pre-mixed in the plasticizer. In some examples, the compositions are kneaded. In other examples, the compositions are extruded continuously in a twin-screw extruder. In addition[light stabilizers and antioxidants, an adhesion control agent is included in the PVB composition. Other agents such as colorants and ultraviolet absorbers which do not adversely affect the functioning of the nucleating agent and adhesion control agent may be included in the PVB composition. Nucleating agents may be added or caused to form during the extrusion process. They may be introduced to the surfaces of the PVB interlayer by coating.

Fabrication of the laminar structures is well known in the art. It is also known that in order to effectively remove most of the air from between the surfaces in the laminar structure, the surface of the PVB sheeting should be roughened. This can be effected mechanically by embossing or by melt fracture during extrusion of the PVB sheet. Retention of the surface roughness is essential to facilitate effective deaeration of the entrapped air during laminate preparation. The surface roughness, Rz, is expressed in microns by a 10-point average roughness in accordance with ISO-R468 of the International Organization for Standardization. For sheeting having a thickness greater than about 0.76 mm, Rz's of up to 60 microns are sufficient to prevent air entrapment. To prevent blocking a minimum Rz of about 20 microns is needed if the sheeting is to be wound up in a roll without interleaving or without anti-blocking agents. The surface roughness of thermoplastic resin sheeting and the methods of characterization and quantification of the surface roughness are described in ANSI /ASME B46.1(1995).

The boundary region between two immiscible phases, like air and PVB, is called "interface." On a macroscopic scale the interface represents an abrupt transition in the chemical and physical characteristics of one bulk phase to the other. On a microscopic scale this transition occurs over the distance of only a few molecular dimensions. Here, with respect to bubbles and delaminations in PVB/glass laminates, according to the common practice, since one phase is air, we use the term "surface." Specifically, the "surface energy" of PVB is the same as the "interfacial energy" of PVB at any PVB/air interface, wherever such an interface may exist, at the boundary of a bubble or a delamination in a laminate, or at the interface of a PVB sheeting with its surroundings.

Air dissolved or dispersed in PVB will vaporize when its equilibrium solubility is exceeded. As in any process involving a phase change, such as boiling, the presence of an existing interface such as that provided by nucleating agents promotes the formation of tiny bubbles called nuclei, and in so doing, accelerates the transformation of air from the dissolved state to the vapor state. These minute nuclei may grow depending on the amount of excess air present. However, if enough nucleating sites are present, all the excess air may vaporize early and the resulting bubbles will not have the driving force to coalesce to form worm-like delaminations.

Test Methods

Adhesion Testing

Adhesion of the laminate, i.e. of the PVB interlayer to glass, is determined using the compressive shear strength test using the jig 10,12 shown in the FIGURE. Laminates for adhesion determination are prepared by first conditioning the polyvinyl butyral interlayer at 23° C.+2° C. in an environment of 23±3% relative humidity overnight before laminating. Referring to the FIGURE, the interlayer 18 is then sandwiched between two pieces of annealed float glass 16 and 20 of dimension 12"×12" (305 mm×305 mm) and 2.5 mm nominal thickness which have been washed and rinsed in demineralized water. The glass/interlayer/glass assembly is then heated in an oven set at 90–100° C. for 30 minutes. Thereafter, it is passed through a set of nip rolls so that the air in the void spaces between the glass and the interlayer may be squeezed out, and the edge of the assembly sealed. The assembly at this stage is called a pre-press. The pre-press is then placed in an air autoclave where the temperature is raised to 135° C. and pressure to 200 psig (14.3 bar). These conditions are maintained for 20 minutes, after which, the air is cooled while no more air is added to the autoclave. After 20 minutes of cooling when the air temperature in the autoclave is under 50° C., the excess air pressure is vented.

The compressive shear strength of the laminate prepared as prescribed above is determined using the method detailed here. Six 1"×1" (25 mm×25 mm) chips are sawed from the laminate. The chips are allowed to conditioned in a room controlled at 23° C.±2° C. and 50%±1% relative humidity for one hour prior to testing. The compressive shear strength of the chip is determined using the jig shown in the FIGURE. The chip 16, 18, 20 is placed on the cut-out on the lower half of the jig 12, and the upper half 10 is then placed on top of the chip. A cross-head is lowered at the rate of 0.1 inch per minute (2.5 mm per minute) until it contacts the upper piece of the device. As the cross-head continues to travel downward, one piece of the chip begins to slides relative to the other. The compressive shear strength of the chip is the shear stress required to cause adhesive failure. The precision of this test is such that one standard deviation is typically 6% of the average result of six chips. An interlayer tested in this way for adhesion which has compressive shear strength of 1400 psi to 4000 psi (1000 N/cm$^2$ to 2700 N/cm$^2$) is considered suitable for use in automobile windshields and automotive side-glass and backlites.

Torture Test

Laminates for the torture test are prepared in the same manner as the ones for the compressive shear strength test except that the laminate size is 150 mm×300 mm. After lamination, each laminate is inspected for visible defects such as bubbles, worm-like or finger-like delamination. If any visible defects are found in a laminate, it is rejected, and another laminate is prepared in its place for the torture test. Two laminates of 150 mm×300 mm from each PVB interlayer are made for the purpose of the torture test.

Laminates without any visible defects are placed in a container filled with water. The container is covered with a loosely fitted lid to avoid splashing while the container is being moved. The entire container with lid is put in an air autoclave where the temperature is raised to 140° C. and the pressure to 150 psig (10.2 bar). These conditions are maintained for 4½ hours, after which the air in the autoclave is cooled for 75 minutes while the pressure is allowed to drop due to the decrease in temperature according to the ideal gas law. When the container is removed from the autoclave, and the lid is removed, air can be seen bubbling from the water although the water temperature is only about 60° C.

The laminates are allowed to sit overnight at room temperature. In a few hours but usually overnight, worm-like defects commonly referred to as delamination and bubbles would develop in some of the test laminate samples. The length of edges occupied by worm-like delamination in each sample is recorded. The length of edges with worm-like defects is the sum total of all the lengths of the defects in that sample. After recording the observations, the laminates are baked in an 80° C. oven for two hours at atmospheric pressure to drive out of solution the remaining air and part of the moisture which might have been absorbed during the torture autoclave cycle. After the laminates are cooled to room temperature, they are examined for defects again. The worm-like delamination length in each laminate is recorded. Changes in defect lengths in the same sample as a result of this baking step can be correlated with the bulk surface energy of the plasticized polyvinyl butyral interlayer.

Haze Testing

Laminates are prepared as described above. The diffusive light transmission and the total transmission are measured according to ASTM D-1003 by using a Hazegard XL211 hazemeter (BYK Gardner-USA). Percent-haze is the diffusive light transmission as a percent of the total light transmission. Laminates with haze greater than 0.35% are not considered suitable for use in automobiles, particularly for windshields.

EXAMPLES

The following examples, in which parts and percentages are by weight unless otherwise specified, further illustrate this invention.

Comparative Example C1

Plasticized polyvinyl butyral sheeting in which the plasticizer was tetra-ethylene glycol di-heptanoate, commercially available as Butacite®, trademark for E. I. du Pont de Nemours' polyvinyl butyral sheeting, was used to prepare laminates according to the method described above. The composition contained potassium formate as the adhesion control agent. Laminates in this comparative example were made with glass rinsed with industrial water and not demineralized water. Laminate adhesion level was 1657 psi (1144 N/cm$^2$) in compressive shear strength. Two laminates were prepared for torture testing as described above. Both laminates developed worm-like delaminations after the torture autoclave cycle. The delaminations grew substantially after baking. The laminates were clear.

Example 1

The PVB interlayer in this example is the same as that in Comparative Example C1. Laminates were prepared in the same manner as in Comparative Example C1 except the interlayer is dipped in a suspension of colloidal silica (Ludox® LS, trademark of E. I. du Pont de Nemours & Co.) diluted to 0.018% solids prior to conditioning for moisture. Adhesion was 1637 psi (1130 N/cm$^2$). Two laminates for the torture test were prepared as described above. Five small bubbles were seen in one of the samples and 20 small bubbles less than 1 mm in diameter were seen along the edges of the other sample shortly after the autoclave torture cycle. [No worm-like defects developed in any sample.]

Comparative Example 2

100 Parts of dry polyvinyl butyral resin was blended with 38.5 tetraethylene glycol di-n-heptanoate. To this mixture potassium formate was added as an adhesion control agent, and 0.0008 part of aluminum chlorohydrate and 0.005 part of polydimethylsiloxane. The composition was tumbled overnight in a glass jar and was kneaded at 150° C. for 20 minutes. Afterwards, the composition was molded into a film of 0.76 mm nominal thickness. One laminate was made for adhesion determination and another for the torture test. Adhesion of the laminates made with this recipe and glass rinsed with industrial water was over 4218 psi [(2192 N/cm$^2$)]. No worn-like delaminations were observed in the torture test. The laminate was opaque so it would not be acceptable for use as an automotive windshield.

Example 2

The PVB interlayer was made the same way as described in Comparative Example C2 except that the amounts of aluminum chlorohydrate was only a small dusting (could not be measured). Adhesion in the resulting laminate was 2340 psi [(1616 N/cm$^2$)]. There were bubbles along the edges of the laminate immediately after the torture test. No worm-like delaminations developed. The laminate was as clear as the ones in Comparative Example C1.

Example 3

100 Parts by weight polyvinyl butyral are mixed in an extruder with 38.5 parts of partially hydrolyzed tetraethylene glycol di-heptanoate plasticizer doped with antioxidants (octylphenol) and ultraviolet light stabilizer (Tinuvin P, Ciba Geigy). The admixture was forced through a slit-die so that it becomes a nominally 0.76 mm sheeting in the process detailed above. 0.08 part of a wetting agent (Silwet® L-7604, Osi Specialties, Inc.) was added to the melt stream. Magnesium formate was added to the melt in the extruder such that the magnesium level in the sheeting was 50 ppm. Some of the formate decomposed in the extruder. One of the decomposition products of magnesium formate is magnesium hydroxide which is insoluble in the plasticized PVB matrix. Some of the magnesium ions also reacted with the heptanoic acid from the plasticizer hydrolysis and formed a salt which has very low solubility in the plasticized PVB matrix. The sample had an adhesion level of 2287 psi (1579 N/cm$^2$) in compressive shear strength. Two laminates were prepared using the method described above. They were subjected to the torture test as described. There were no worm-like delaminations in either laminate in the torture test. Some bubbles were immediately visible after the autoclave torture cycle. The presence of a nucleating agent is evident in this example because the haze of the laminate was 0.36%, significantly higher than in laminates from Comparative Example C1.

Comparative Example C3

The PVB interlayer in this comparative example is the same as that in Comparative Example C1 except that the laminates were made with glass rinsed with demineralized water before lamination. Potassium formate was used as the adhesion control agent. The sample had an adhesion level of 2967 psi (2047 Ncm$^2$) in compressive shear strength. Two laminates were prepared as above. Half the samples developed delamination after the baking cycle of the torture test.

Example 4

100 Parts by weight polyvinyl butyral are mixed in an extruder with 38.5 parts of tetraethylene glycol di-heptanoate plasticizer doped with antioxidants (octylphenol) and ultraviolet light stabilizer (Tinuvin P, Ciba Geigy). The admixture was forced through a slit-die so that it becomes a nominally 0.76 mm sheeting in the process detailed above. 0.007 parts of a polyethylene glycol of molecular weight 2000 was added to the melt stream as a solution in water. Potassium formate was added to the melt in the extruder such that the potassium level in the sheeting was 255 ppm. The sample had an adhesion level of 3071 psi (2119 N/cm$^2$) in compressive shear strength. Three laminates were prepared with the glass rinsed with demineralized water using the method described above. They were subjected to the torture test as described. There were no worm-like delaminations in any laminate subjected to the torture test. Bubbles were immediately visible after the autoclave torture cycle.

Comparative Example C4

The PVB interlayer in this comparative example is the same as that in Example 4 except that it does not contain any polyethylene glycol. Potassium formate was added to the melt in the extruder such that the potassium level in the sheeting was 249 ppm. The sample had an adhesion level of 3207 psi (2214 N/cm$^2$) in compressive shear strength. Three laminates were prepared with glass rinsed with demineralized water using the method described above. They were subjected to the torture test as described. Two of the three samples developed delaminations after the torture test.

What is claimed is:

1. A glass/adhesive sheet laminar structure comprising at least one layer of glass and a sheet of plasticized polyvinyl butyral wherein the polyvinyl butyral has blended therein an adhesion control agent to provide a preselected level of adhesion between said layer of glass and said sheet of polyvinyl butyral, said structure having pin point pockets of air entrapped in said sheet, said structure including a nucleating agent which is insoluble or incompatible with said polyvinyl butyral, said nucleating agent being present in an amount sufficient to prevent delayed delamination of said structure but not change significantly the level of adhesion between said layer of glass and the sheet of polyvinyl butyral wherein the polyvinyl butyral is plasticized with a triethylene glycol diester or tetraethylene glycol diester wherein said nucleating agent is present in an amount from about 0.0001 to about 0.1 part by weight per 100 parts of polyvinyl butyral resin in the interlayer.

2. A laminar structure of claim 1 wherein said nucleating agent is colloidal silica.

3. A glass/adhesive sheet laminar structure comprising at least one layer of glass and a sheet of plasticized polyvinyl butyral wherein the polyvinyl butyral has blended therein an adhesion control agent to provide a preselected level of adhesion between said layer of glass and said sheet of polyvinyl butyral, said structure having pin point pockets of air entrapped in said sheet, said structure including a nucleating agent which is insoluble or incompatible with said polyvinyl butyral, said nucleating agent being present in an amount sufficient to prevent delayed delamination of said structure but not change significantly the level of adhesion between said layer of glass and the sheet of polyvinyl butytal wherein the polyvinyl butyral is plasticized with a triethylene glycol diester or tetraethylene glycol diester wherein said nucleating agent is selected from the group consisting of: polyethylene glycol and/or copolymers of polyethylene glycol; aluminum or zirconium chlorohydrate; hydroxides of metals which are insoluble in polyvinyl butyral; and, carboxylic acids of low solubility in plasticized polyvinyl butyral.

4. In a process for preventing delamination in glass/adhesive structures comprised of at least one layer of glass and a sheet of plasticized polyvinyl butyral adhesive wherein pin point pockets of air are entrapped in said sheet, the steps of preparing a bulk composition of plasticized polyvinyl butyral the steps of preparing a bulk composition by blending with said polyvinyl butyral an adhesion control agent which provides a preselected level of adhesion between said glass and said sheet, before lamination applying to the surface of said sheet or the surface of said layer of glass a nucleating agent in an amount sufficient to prevent said pockets of air from coalescing apd causing delaminations.

5. The process of claim 4 wherein the nucleating agent is coated onto an extruded sheet of plasticized polyvinyl butyral.

6. In a process for preventing delamination in glass/adhesive structures comprised of at least one layer of glass and a sheet of plasticized polyvinyl butyral adhesive wherein pin point pockets of air are entrapped in said sheet, the steps of preparing a bulk composition of plasticized polyvinyl butyral the steps of preparing a bulk composition by blending with said polyvinyl butyral during kneading or extrusion (1) an adhesion control agent which provides a preselected level of adhesion between said glass and said sheet and (2) a nucleating agent in an amount sufficient to prevent said pockets of air from coalescing and causing delaminations.

7. The process of claim 4 wherein the nucleating agent if formed in situ via chemical reaction of minor components in the plasticized polyvinyl butyral.

8. A laminar structure of claim 1 wherein said adhesion control agent is selected from an alkali metal or an alkaline earth metal or a transition metal salt.

* * * * *